United States Patent [19]

Shimano

[11] 4,435,983

[45] Mar. 13, 1984

[54] HANDLE STEM FOR A BICYCLE

[75] Inventor: Keizo Shimano, Sakai, Japan

[73] Assignee: Shimano Industrial Company Limited, Osaka, Japan

[21] Appl. No.: 320,105

[22] Filed: Nov. 10, 1981

[30] Foreign Application Priority Data

Nov. 22, 1980 [JP] Japan .................. 55-168009
Nov. 22, 1980 [JP] Japan .................. 55-168010

[51] Int. Cl.³ .............................. G01P 1/02
[52] U.S. Cl. ........................... 73/493; 73/495; 280/289 R; 340/134; 340/135
[58] Field of Search ............. 116/62.4, 62.1, 62.2, 116/62.3, 28 R; 73/493, 495; 340/134, 135; 280/289 R, 289 H; 74/551.8

[56] References Cited

U.S. PATENT DOCUMENTS

| 2,168,939 | 8/1939 | Kralft | 74/551.8 |
|---|---|---|---|
| 2,794,166 | 5/1957 | Ferdon et al. | 340/135 |
| 3,937,629 | 2/1976 | Hamosaka | 74/551.8 |
| 4,068,858 | 1/1978 | Harrison et al. | 280/289 R |

FOREIGN PATENT DOCUMENTS

| 1092332 | 11/1960 | Fed. Rep. of Germany | 74/551.8 |
|---|---|---|---|
| 277519 | 8/1951 | Switzerland | 340/134 |
| 493023 | 9/1938 | United Kingdom | 74/551.8 |
| 694812 | 7/1953 | United Kingdom | 74/551.8 |
| 2023321 | 12/1979 | United Kingdom | 340/134 |

OTHER PUBLICATIONS

Pacer 2000 Advertisement p. 2, Jul. 1979, Bicycling.

Primary Examiner—Gerald Goldberg
Assistant Examiner—Tom Noland
Attorney, Agent, or Firm—Stevens, Davis, Miller & Mosher

[57] ABSTRACT

A handle stem for a bicycle, comprising a stem body, a projecting portion extending from the top of said stem body radially outwardly thereof, and a holding portion for a handle bar, provided at the foremost end of the projecting portion, so that a hollow, which is provided therein, houses an indicator electrically displaying running conditions of the bicycle.

4 Claims, 9 Drawing Figures

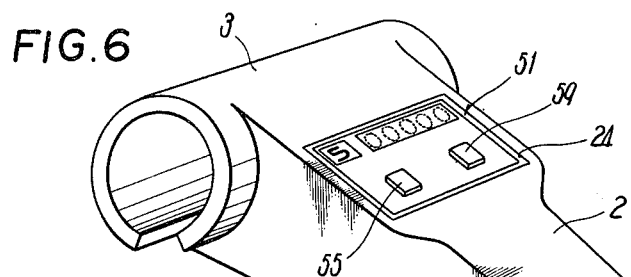
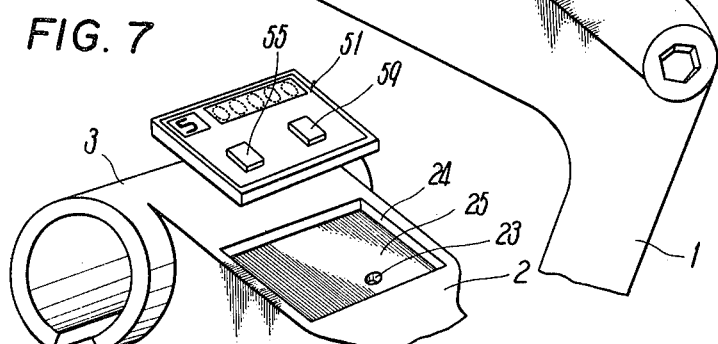
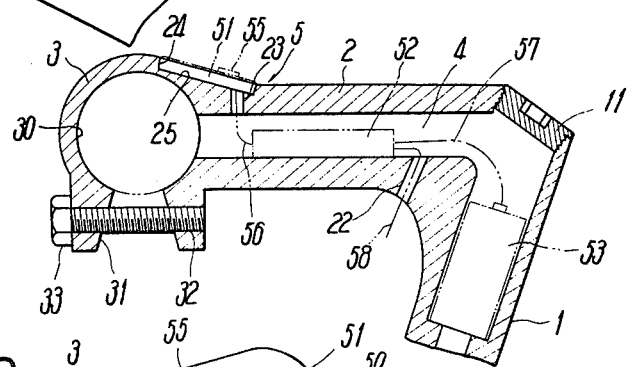
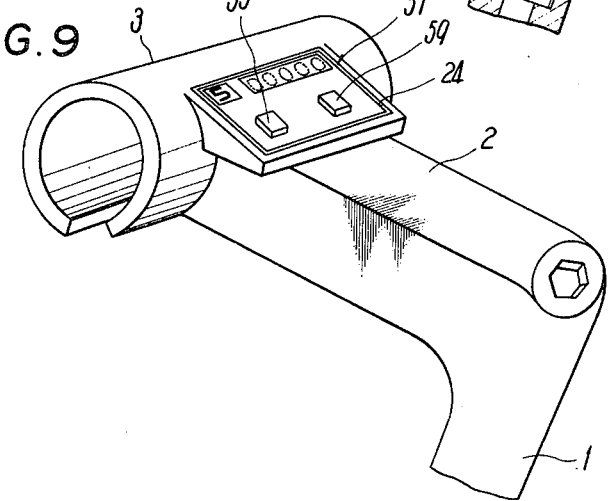

HANDLE STEM FOR A BICYCLE

FIELD OF THE INVENTION

This invention relates to a handle stem for a bicycle, and more particularly to a handle stem comprising a stem body, a projecting portion extending from the top of the stem body radially outwardly thereof, and a holding portion which is provided at the foremost end of the projecting portion and has an insertion bore for a handle bar, and being provided with an indicator electrically indicating a working condition, such as running speed or distance, of the bicycle.

BACKGROUND OF THE INVENTION

Conventionally, an indicator for indicating the bicycle running speed or the like has been developed, which is usually mounted on a handle bar in the vicinity of a handle stem mounting portion and projects forwardly and obliquely upwardly from the handle bar.

The conventional indicator, which is mounted on the handle bar by use of a tightening band with a bolt and nut, is complex and troublesome to mount and needs many parts, and also is unstable and can shake or shift out of position, thereby making it difficult for a driver to read out the running speed or the like. Furthermore the indicator which projects significantly from the handle bar is liable to hit a foreign object when the bicycle is running or falls down, and often leads to a breakdown.

SUMMARY OF THE INVENTION

In the light of the above problems of the conventional indicator, this invention has been designed. An object of the invention is the provision of a handle stem for a bicycle, which can easily and fixedly mount the indicator by use of a simple mounting means so that it does not project considerably outwardly from the handle bar.

In other words, this invention is directed to utilization of a projecting portion of the handle stem for assembling thereto the indicator and is characterized in that a hollow is formed at the projecting portion into which the indicator is assembled.

Therefore, the prevent invention does not require any particular means for mounting the indicator and reduces the number of parts which results in a low manufacturing cost. Also, the assembly of indicator is easy and reliable, avoids a large outward projection, and allows the driver to easily read the indicator at the projecting portion.

These and other objects, features and advantages of the invention will become more apparent upon a reading of the following detailed specification and drawings.

BRIEF DESCRIPTION OF THE DRAWINGS

FIG. 6 is a partially perspective view of the FIG. 5 embodiment, FIG. 7 is a perspective view of the same, with the indicator, removed FIG. 8 is a longitudinal sectional view of a further modified embodiment of the invention, corresponding to FIG. 2, and FIG. 9 is a perspective view of the FIG. 8 embodiment.

DETAILED DESCRIPTION OF THE INVENTION

Figure 1:
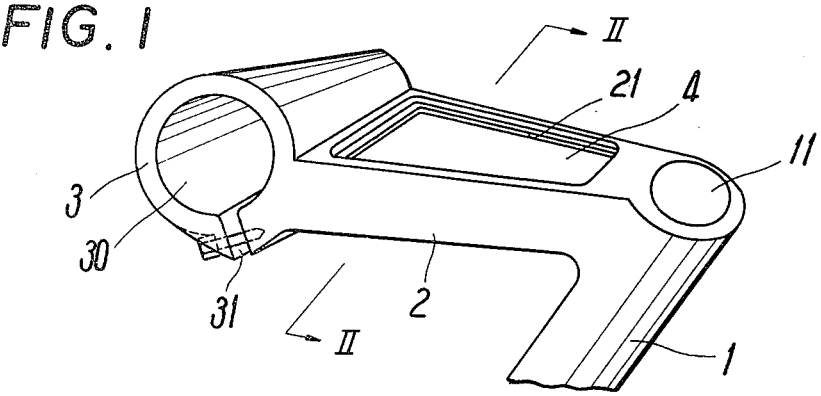
FIG. 1 is a perspective view omitted in part, of an embodiment of a handle stem of the invention.

A handle stem of the invention comprises a tubular stem body 1 mounted on the upper end of a front fork (not shown) of the bicycle frame, a projecting portion 2 extending from the top of stem body 1 radially outwardly thereof, and a holding portion 3 provided at the foremost end of projecting portion 2 and holding a handle bar (not shown), the holding portion 3 including an insertion bore 30 extending perpendicularly to the lengthwise direction of projecting portion 2 and insertably supporting the handle bar, a cutout 31 opening the insertion bore 30 radially in part, and a threaded bore 32, so that a bolt 33 screws with the threaded bore 32 and contracts the insertion bore 30 in diameter, thereby fixing the handle bar to the projecting portion 2.

Figure 2:
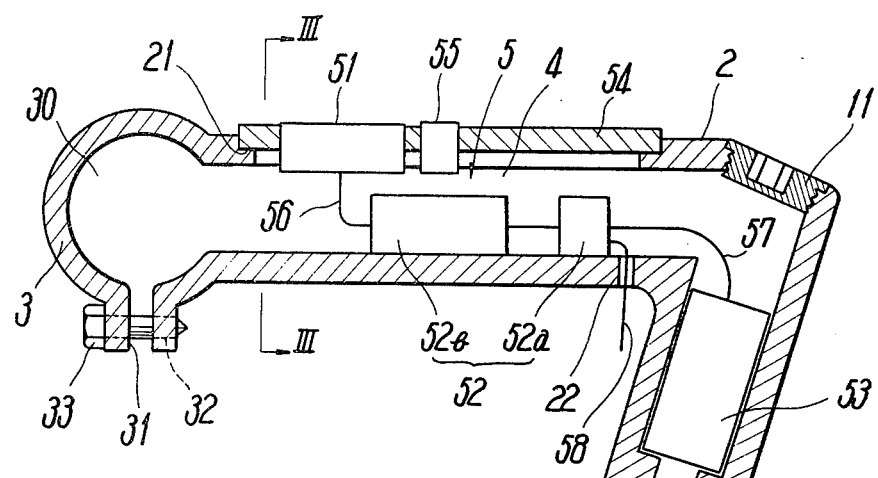
FIG. 2 is a longitudinally sectional view of the handle stem in FIG. 1, showing an assembly of an indicator.
Figure 3:
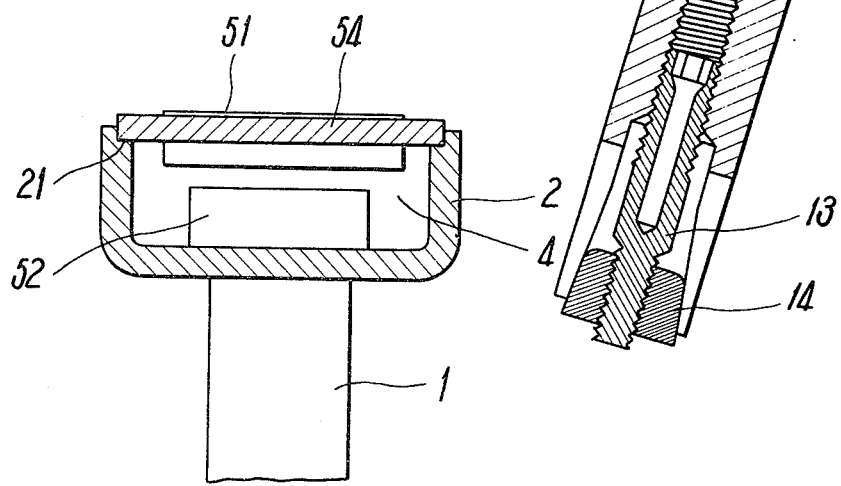
FIG. 3 is an enlarged sectional view taken on the line III—III in FIG. 2.

The projecting portion 2, as shown in FIGS. 1 and 2, is formed in a box-like shape in section and increases in width gradually from the stem body 1 side toward the holding portion 3 and has a hollow 4 into which an indicator 5 to be hereinafter described is assembled.

The indicator 5 comprises a display unit 51, electric parts 52, and a power source 53, the display unit 51 mainly using a liquid crystal to display the bicycle's running condition, such as speed, a distance, and the number of the speed change stage selected by a derailleur. The bicycle provides detectors for detecting the rotations of its wheel or hub and the speed change stage of the derailleur, so that output signals from the detectors are amplified and compared to be given to the display unit 51 as digital signals.

The electric parts 52 comprise an amplifier 52a for amplifying the signals from the detectors and a microcomputer 52b for processing the signals, the microcomputer 52b being connected at its output terminal with the display unit 51 through a wire 56.

Referring to FIGS. 1 and 2, the electric parts 52 of indicator 5 are housed within the hollow 4, which is open upwardly and has a stepped portion 21 surrounding the opening. A plate 54 closes the opening and carries the display unit 51, and a control switch 55 and a mode switch (not shown) for electric parts 52. The hollow 4 communicates with the interior of stem body 1 so that the electric parts 52 connect through a wire 57 with a power source 53 comprising batteries and supported at the upper portion of stem body 1. The projecting portion 2 is provided with a through bore 22 extending vertically to be open at the hollow 4, so that wires 58 connecting the detectors are led into the hollow 4 from the outside through the through bore 22.

In addition, in FIG. 2, reference numeral 11 designates a cap which is screwed with the top of stem body 1 and removable for exchanging batteries 53, 13 designates a handle expander bolt, and 14 designates an expander cone.

Alternatively, the projecting portion 2 may be shaped other than the aforesaid shape, and the hollow 4 may be open downwardly, in which the electric parts 52 are easily sealed with the surrounding walls of projecting portion 2.

Figure 4:
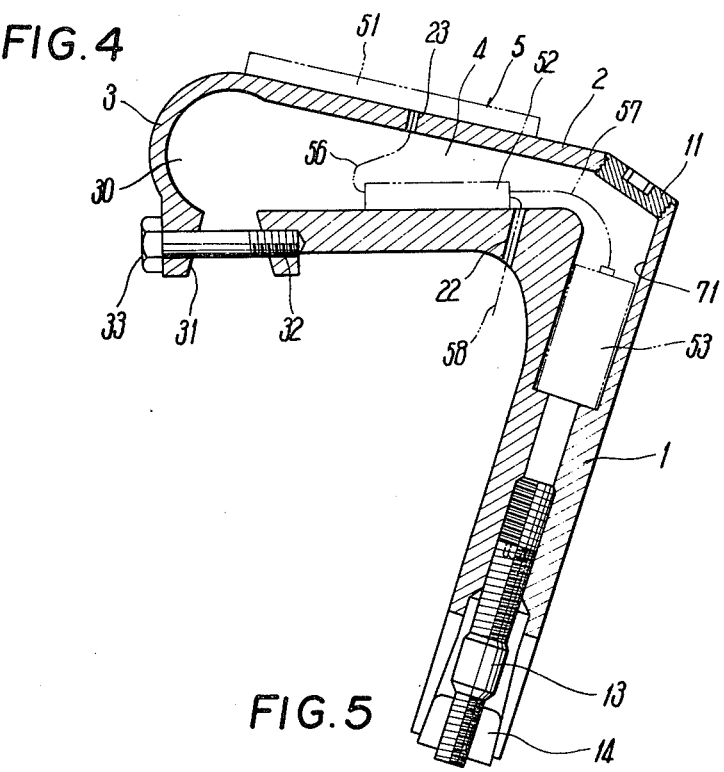
FIG. 4 is a longitudinally sectional view of a modified embodiment of the invention, corresponding to FIG. 2.

Furthermore, the hollow 4, as shown in FIG. 4, may not be open, in which case the cap 11 is removed from the top of stem body 1 and the electric parts 52 are housed therethrough within the hollow 4.

In this instance, the display unit 51 also is placed on the upper surface of projecting portion 2 and the lead wire 56 extends through an orifice 23 provided at the upper surface.

Hence, the electric parts 52 are housed within the closed projecting portion 2, thereby being protected nearly completely from rain water or an impact from outside.

In the FIG. 4 embodiment, the upper surface of projecting portion 2 is slanted forwardly upwardly as a whole and carries the display unit 51 so that a driver can look straight at the display unit 51 and accurately and quickly read out its display.

Figure 5:
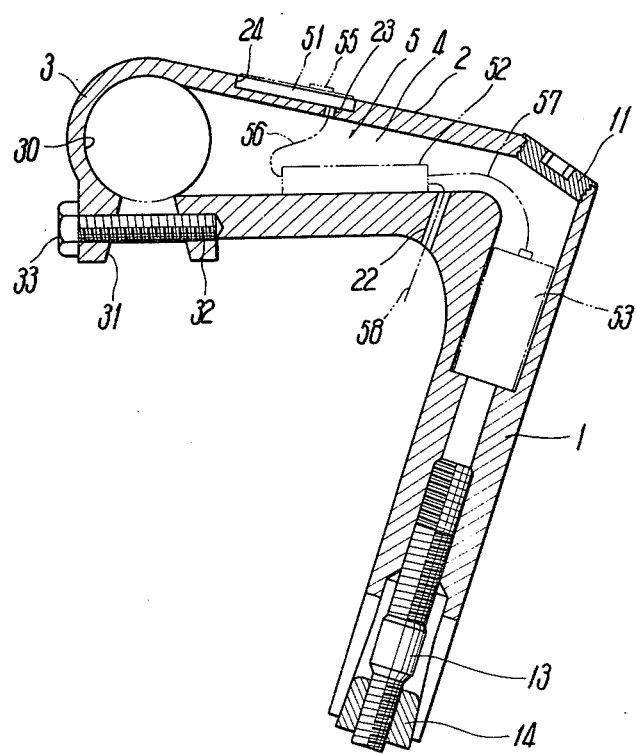
FIG. 5 is a longitudinal sectional view of another modified embodiment of the invention, corresponding to FIG. 2.

The display unit 51, which is placed merely on the upper surface of projecting portion 2 as shown in FIG. 4, may alternatively be fitted into a recess 24 provided at the upper surface near the foremost end of projecting portion 2 as shown in FIG. 5. In this instance, the fore part of projecting portion 2, as shown in FIGS. 6 and 7, is widthwise enlarged to form a flat surface 25 for mounting thereon the display unit 51.

Alternatively, the projecting portion 2, as shown in FIGS. 8 and 9, may be slanted in part. In addition, in FIGS. 6, 7 and 9, reference numeral 59 designates a mode switch.

As seen from the above, the present invention provides the hollow 4 at the projecting portion 2 constituting the handle stem, the hollow 4 housing therein the electric parts 52 of indicator 5, and the projecting portion 2 being utilized for casing the indicator 5, whereby a separate casing is not required to house the electric parts 52 or support the display unit 51, thus reducing the number of parts to that extent.

Also, no casing projects outwardly from the handle stem or handle bar, thereby ensuring safety of the bicycle to that extent. The projecting portion is utilized for mounting the indicator thereon, and the display unit is positioned so as to be easily visible by the driver, so that he can read out the display without having to neglect watching where he is going.

Although several embodiments have been described, they are merely exemplary of the invention and not to be constructed as limiting, the invention being defined solely by the appended claims.

What is claimed is:

1. A handle stem for a bicycle, which carries a handle bar, said handle stem comprising
    a stem body,
    a projecting portion extending from a top of said stem body radially outwardly thereof, said projecting portion containing an opening in an upper surface thereof and
    a holding portion provided at a foremost end of said projecting portion and having an insertion bore for said handle bar,
    said projecting portion being provided with an indicator comprising: a display unit which electrically displays running condition of the bicycle; electronic components; and a power source; said projecting portion containing a first hollow area located below said upper surface and opening therein, said first hollow area housing therein said electronic components of said indicator, said display unit of said indicator being mounted above said first hollow area and over said opening, electronically connected to said electronic components through said opening, and exposed to view on a top surface of said projecting portion.

2. A handle stem for a bicycle according to claim 1, wherein said stem body contains a second hollow area and said second hollow area is open inwardly of said stem body.

3. A handle stem for a bicycle according to claim 2, wherein said stem body supports said power source for said indicator.

4. A handle stem for a bicycle according to claim 1, wherein the foremost end portion of said projecting portion rises slantwise with respect to the top of said stem body.

* * * * *